United States Patent [19]

Hansen

[11] 4,152,859

[45] May 8, 1979

[54] FISHING LURE RETRIEVER

[76] Inventor: Nils B. Hansen, R.D. #1, Marietta, N.Y. 13110

[21] Appl. No.: 862,546

[22] Filed: Dec. 20, 1977

[51] Int. Cl.$^2$ ............................................. A01K 97/00
[52] U.S. Cl. .................. 43/17.2; 294/66 R; 294/110 A
[58] Field of Search ............... 43/5, 17.2; 294/66 R, 294/110 A

[56] References Cited

U.S. PATENT DOCUMENTS

| 2,553,235 | 5/1951 | Brace | 294/110 A |
| 2,760,810 | 8/1956 | Smith | 43/17.2 X |
| 3,208,786 | 9/1965 | Eddleman | 43/5 |
| 3,360,292 | 12/1967 | Trammell | 43/17.2 X |
| 3,404,482 | 10/1968 | Maske | 43/17.2 |

FOREIGN PATENT DOCUMENTS 699302 12/1964 Canada ............................................. 43/5

Primary Examiner—Nicholas P. Godici
Attorney, Agent, or Firm—Bruns & Jenney

[57] ABSTRACT

A retriever for recovering a snagged or fouled fishing lure consisting of a weighted body adapted to be slidably received upon the snagged line and a pair of cooperating jaw members. The proximal ends of the jaw members are supported upon the body by means of spring loaded hinges which bias the jaws into a normally closed position. The distal ends of the jaws are provided with teeth arranged to snare a lure therein. A trigger mechanism is also provided for holding the jaws open against the biasing pressure of the hinges and, when actuated, allows the jaws to move into the closed position. In operation, the retriever is slidably mounted upon the snagged line with the jaws in an open position and the retriever run down the line to the lure whereupon the trigger is actuated to capture the lure between the jaws. The retriever, with the lure entrapped therein, is brought to the surface using a high strength line attached to the retriever.

9 Claims, 5 Drawing Figures

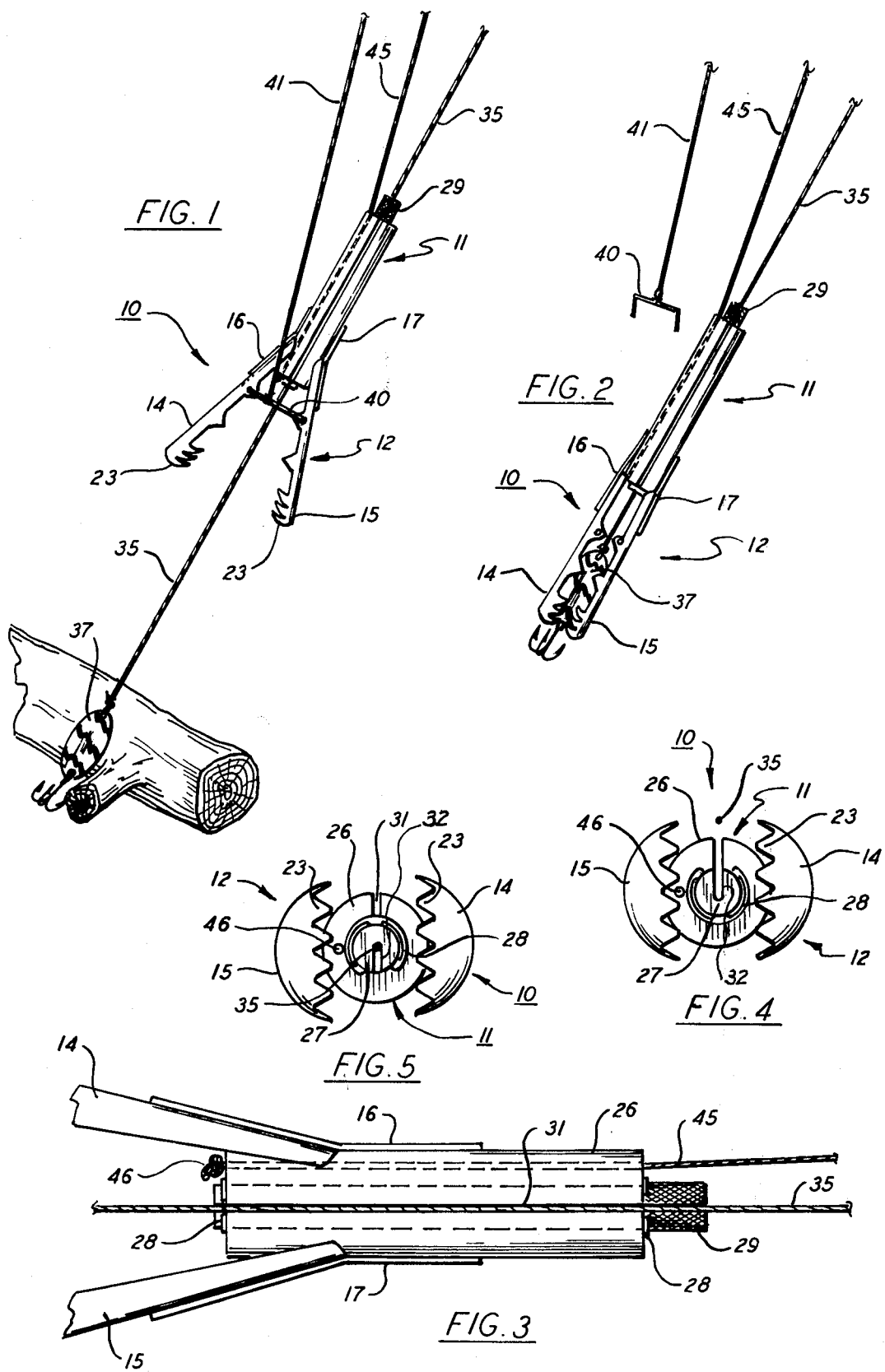

FISHING LURE RETRIEVER

BACKGROUND OF THE INVENTION

This invention relates to a fishing appliance and, in particular, to apparatus for recovering a lure or plug which has snagged in deep water.

When trolling or casting for fish in relatively deep water, it is not uncommon for the hook, and thus the attached lure, to become entangled with some heavy obstruction located well below the surface. As all fishermen are aware, excessive tugging on the fouled line generally results in the line breaking and the lure being lost. The loss of a lure can prove to be not only costly but also a frustrating experience where the lure has shown itself to be a particularly effective device.

Some devices are known in the art for recovering snagged lures, however, most of these devices have certain disadvantages associated therewith that make them unsuitable for use by the average fisherman. As exemplified by the retriever disclosed in U.S. Pat. No. 3,360,292, many of these devices, although effective, typically involve large complex mechanisms which cannot be conveniently stored and carried in a conventional tackle box. Other retrievers, such as the ones illustrated in U.S. Pat. Nos. 2,714,777 and 3,375,602, are specifically designed to actively engage only the swivel or leader which holds the lure to the line. Once engaged, it is hoped that the swivel is strong enough to permit the snagged lure, to be pulled free without separating therefrom. In practice, particularly where the tackle is less than new, the swivel oftentimes breaks before the lure can be freed.

SUMMARY OF THE INVENTION

An object of the present invention is to improve apparatus for recovering lures or the like which become snagged or otherwise fouled in relatively deep water.

A further object of the present invention is to provide a compact, simple to operate, lure retriever that can be conveniently stored and carried by the average fisherman in his tackle box.

Another object of the present invention is to provide a spring actuated lure retriever having a trigger mechanism for enabling the retriever to capture a lure in deep water and be brought to the surface.

These and other objects of the present invention are attained by means of a lure retriever that includes an elongated body, a pair of cooperating jaw members hinged at one end about the body and having teeth at the opposite ends for snaring a lure, a spring for biasing the jaws into a normally closed position, a trigger mechanism for holding the jaws open so they may be positioned over a snagged lure by running the retriever down the snagged line and, when actuated for closing the jaws over the lure, and means to bring the retriever and encaptured lure to the surface.

BRIEF DESCRIPTION OF THE DRAWINGS

For a better understanding of these and other objects of the present invention, reference is had to the following detailed description of the invention to be read in conjunction with the following drawings, wherein:

FIG. 1 is a view showing the retriever of the present invention, with its jaws cocked in an open position, being run down a fishing line toward a snagged lure preparatory to capturing the lure;

FIG. 2 is another view of the retriever illustrated in FIG. 1 showing the retriever jaws closed over a lure during the recovery thereof;

FIG. 3 is a partial enlarged side view of the instant retriever further illustrating the construction of the body portion thereof, and FIGS. 4 and 5 are both end views taken at the jaw supporting end of the retriever showing the components of the retriever body in a first position to receive a fishing line therein and a second position with the line secured in sliding relationship within the body.

DESCRIPTION OF THE PREFERRED EMBODIMENT

Referring now to the drawings, there is shown a lure retriever 10 for recovering snagged or fouled fishing gear, typically in the form of a lure or a plug, from relatively deep water that prevents hand recovery thereof. The retriever includes two main sections; a body section 11 of generally elongated construction and a lure gripper section 12 of similar elongated construction extending outwardly in an axial direction from the body. The gripper section is comprised of two cooperating jaw members 14,15 of the same general construction that are secured at their proximal ends to the body by means of spring loaded hinges 16 and 17. In operation, the hinges serve to continually bias the jaw members together into a normally closed position.

As best seen in FIG. 3, the body 11 of the retriever is an elongated, generally cylindrical element which, as will be explained in further detail below, is adapted to be slidably received upon a fishing line with the line being axially aligned within the body. The two jaw members, in turn, are mounted at their proximal ends in diametrical opposition at the front end of the body so that a fishing line passing through the body is centered between the jaws. The inside surface of each jaw member at the proximal end is contoured to complement the outer periphery of the body and to permit the jaws to move freely about the body between a first closed position and a second opened position. In assembly, the proximal end of each jaw member is secured to one side of the associated hinge, as for example, by spot welding or the like, while the other side of the hinge is similarly affixed upon the outer surface of the body 11.

As illustrated, the hinge is in the form of a relatively flat spring possessing a module so as to bring the jaws together with a force high enough to snare a lure or the like therebetween. Although a flat spring hinge is shown in this embodiment of the invention, any suitable spring loaded hinge capable of carrying out the required jaw closing function may be used in the practice of the present invention. In assembly, the spring loaded hinges permit the extended or distal ends of the jaw members to be pivoted symetrically about the axis of the retriever to a point wherein a fishing lure or plug can be readily accommodated therebetween.

The distal ends of each jaw member is dished out to provide ample room for capturing a lure or the like therebetween. As best illustrated in FIGS. 4 and 5, the distal ends of the jaws are also provided with teeth 23 located along the inner rim thereof which point inwardly toward the axis of the retriever. When the jaws are located in the normally closed condition, the teeth cant rearwardly toward the body of the retriever. The degree of cant is such that a captured lure, acting against the teeth, will tend to further lock the jaws in a closed position under increased pressure when the lure resists movement of the retriever during recovery thereof.

The body 11 of the retriever contains a relatively large outer casing 26 of cylindrical form in which is rotatably mounted a rotor 27 of generally solid construction. The axial length of the rotor is greater than that of the casing whereby the two ends of the rotor extend outwardly from the two end walls of the casing. The rotor is retained in the casing by means of two snap rings 28. The extended right hand end 29 of the rotor, as seen in FIG. 3, is knurled to facilitate hand turning of the rotor within the casing.

As best seen in FIGS. 4 and 5, both the casing and the rotor are furnished with radial saw cut openings extending along the entire axial length of the two elements. The radial cut 31 in the casing is brought through the casing wall while the cut 32 in the rotor is brought to the axial centerline of the rotor. The cut in the casing is located about 90° from the hinges supporting the jaws on the body with the opening of the snap ring retainers being aligned with the cut as shown in FIGS. 4 and 5. By rotating the rotor within the casing, the two saw cuts can be brought into alignment as shown in FIG. 4. The width of the cuts is such that a fishing line 35 can be passed downwardly through the casing and centered along the axis of the rotor. Further rotation of the rotor causes the line to be captured within the body as shown in FIG. 5. The casing is preferably fabricated of a relatively heavy material that furnishes sufficient weight to the retriever structure to allow the retriever to be gravity fed down the captured line toward a snagged lure.

As depicted in FIG. 1, when recovering a snagged lure 37, the body of the retriever is slidably mounted upon the fishing line 35 as described above and the biased jaw members loaded into an open position using a trigger mechanism 40. As best seen in FIG. 2, the trigger mechanism is made up of a U-shaped pin 40 and an actuating line 41 secured to the midsection of the pin base. In assembly the two extended arms of the U-shaped pin are inserted into holes provided in each of the jaw members to support the jaws in an open position in the manner illustrated in FIG. 1. The loaded retriever is then run down the fishing line, jaw end first. When the retriever has bottomed with the open jaws positioned over the lure, the user actuates the trigger by gently pulling on line 41 to remove the pin from its holding position. This, in turn, allows the jaws to snap shut over the lure capturing it within the retriever.

A thin high strength cable 45, preferably being made of steel line, is securely affixed to the body of the retriever by running the cable through an axially extended hole formed in the casing wall and terminating the cable in an oversized metal bead 46. Once the lure is captured, the cable can be pulled upon with considerble force without fear of the cable parting or the retriever breaking. Because of the shape of the teeth acting against the lure, the pulling force exerted against the cable is effectively translated into a closing force against the jaws thus further enhancing the recovery power of the retriever. The overall strength of the retriever is such that a lure or plug can be brought to the surface minus the snagged hooks, however, this may be of small concern where a costly or favorite lure is recovered.

It is further envisioned that the present retriever may be utilized, under certain conditions, without the need for the trigger mechanism. In this application, a relatively soft spring hinge is utilized which will allow the jaws to automatically open over the snagged lure under the weight of the body as the retriever slides down the line during a recovery operation. Once the lure passes inwardly beyond the teeth, the biased hinges cause the jaws to close behind the lure. Pulling on the recovery cable, in turn, forces the lure against the rearwardly canted teeth thus causing the teeth to bite into the lure with sufficient force to hold the lure captured therein.

While this invention has been described with reference to the structure disclosed herein, it is not confined to the details set forth and this application is intended to cover any modifications or changes that may come within the scope of the following claims.

I claim:

1. Apparatus for recovering a fishing lure and line which is snagged or fouled in relatively deep water including
   an elongated body having means operatively associated therewith for slidably receiving a snagged fishing line therein, said body possessing sufficient weight whereby it is capable of sliding down the line toward a lure affixed thereto under the influence of gravity,
   a pair of cooperating jaw members, the proximal end of which are mounted at the front end of said body with the jaws extending outwardly therefrom in a generally axial direction, said jaws having teeth formed in the distal end thereof being arranged to move between an open position for receiving a lure therebetween and a closed position for capturing said lure therebetween,
   a spring loaded hinge for securing each jaw member to the body and for biasing the jaws into a closed position,
   a trigger means having a pin extending between the jaws for holding the jaws in an open position and an actuator for removing the pin whereby the jaws are allowed to close, and
   recovery means for raising the body, and thus the jaws secured thereto, to the surface.

2. The apparatus of claim 1 wherein said elongated body comprises an outer casing and a rotor rotatably mounted therein, the casing having a radial cut passing through the wall thereof and the rotor having a radial cut passing inwardly from the outer periphery to the axis thereof whereby a fishing line can be axially aligned within the rotor when the two cuts are brought into radial alignment.

3. The apparatus of claim 1 wherein the rotor extends outwardly from the casing in an axial direction, said rotor extension being provided with a knurled surface to facilitate rotation of the rotor within the casing.

4. The apparatus of claim 1 wherein said teeth are canted rearwardly from the distal end toward the proximal end of the jaw members whereby a snagged lure captured therebetween forces the jaws closed when the body is raised to the surface.

5. The apparatus of claim 1 wherein said recovery means for raising said body is a high strength cable passing axially through said casing.

6. Apparatus for recovering a fishing lure and line that have become snagged in relatively deep water including
   a weighted body having means operatively associated therewith for slidably receiving a snagged line therein whereby the body can be gravity fed down the line toward a lure attached thereto,
   a pair of rigid semicircular jaw members extending outwardly from the body in a forward direction that are adapted to close over the lure to substantially encompass said lure therebetween, spring members secured to the body and being arranged to act upon the jaws to lightly bias the jaws into a closed position with a force such that said lure can pass between the jaws as they are moved down the line under the weight of said body to capture the lure therebetween, recovery means for raising the body and associated jaws to the surface, and a plurality of teeth formed in each of said jaw members for engaging a lure captured therebetween, said teeth being canted rearwardly toward said body at an angle wherein the snagged lure acts against the teeth as the body is recovered to force the jaws into said closed position.

7. The apparatus of claim 6 wherein said spring members are a pair of flat hinges, each of which is secured to one end of one of said jaw members.

8. The apparatus of claim 7 wherein said body includes an elongated outer casing and an inner rotor rotatably mounted in the casing, the casing having a radial slit passing through the side wall thereof and the rotor having a radial slit extending from its outer periphery to its axis whereby a fishing line can be axially aligned within the rotor when the slits are in radial alignment.

9. The apparatus of claim 8 having further means for turning the rotor within the casing to slidably secure said line within said body.

* * * * *